United States Patent [19]

Bennett et al.

[11] Patent Number: 5,828,475
[45] Date of Patent: *Oct. 27, 1998

[54] BYPASS SWITCHING AND MESSAGING MECHANISM FOR PROVIDING INTERMIX DATA TRANSFER FOR A FIBER OPTIC SWITCH USING A BYPASS BUS AND BUFFER

[75] Inventors: Dwayne R. Bennett, Scarborough; Clifford S. Yeung, Richmond Hill; Wayne Wu, Rexdale, all of Canada

[73] Assignee: McDATA Corporation, Broomfield, Colo.

[ * ] Notice: The term of this patent shall not extend beyond the expiration date of Pat. No. 5,490,007.

[21] Appl. No.: 790,697

[22] Filed: Jan. 29, 1997

Related U.S. Application Data

[63] Continuation of Ser. No. 547,856, Oct. 25, 1995, abandoned.
[51] Int. Cl.⁶ .................................................. H04J 14/08
[52] U.S. Cl. ..................... 359/139; 359/152; 370/522; 395/872
[58] Field of Search ........................... 359/109, 117–119, 359/128, 137, 139, 152; 370/522, 412, 429; 395/872

[56] References Cited

U.S. PATENT DOCUMENTS 4,554,673  11/1985  Stevens ................................. 359/118
5,490,007  2/1996  Bennett et al. ......................... 359/139
5,502,719  3/1996  Grant et al. ............................ 370/412

Primary Examiner—Kinfe-Michael Negash
Attorney, Agent, or Firm—Stuart T. Langley; William J. Kubida; Holland & Hart LLP

[57] ABSTRACT

A system and method for inserting intermix frames into a continuous stream of class 1 frames. A bypass bus, in conjunction with a buffer, are provided within a fiber optic switch element, to route intermix data frame through the switch that is concurrently transmitting class 1 data. A channel module, which is disposed between a switch module and a plurality of fiber optic channels, comprises a port intelligence system and a memory interface system. The port intelligence system is responsible for transmitting and receiving data from the fiber optic channels in accordance with a predetermined protocol, preferably Fibre Channel. The memory interface system comprises a receive memory unit, a transmit memory unit and memory control logic. When an intermix frame is to be passed through the switch, the intermix frame is passed to the buffer concurrently while class 1 data transfer occurs via the bypass bus. After the intermix frame has been completely written into the buffer, the memory control logic waits to detect a tag indicative of a break in the class 1 data transfer. The control logic will then switch the MUX and cause the buffer to commence writing the intermix frame to the port intelligence system for transfer to a predetermined fiber optic channel.

11 Claims, 9 Drawing Sheets

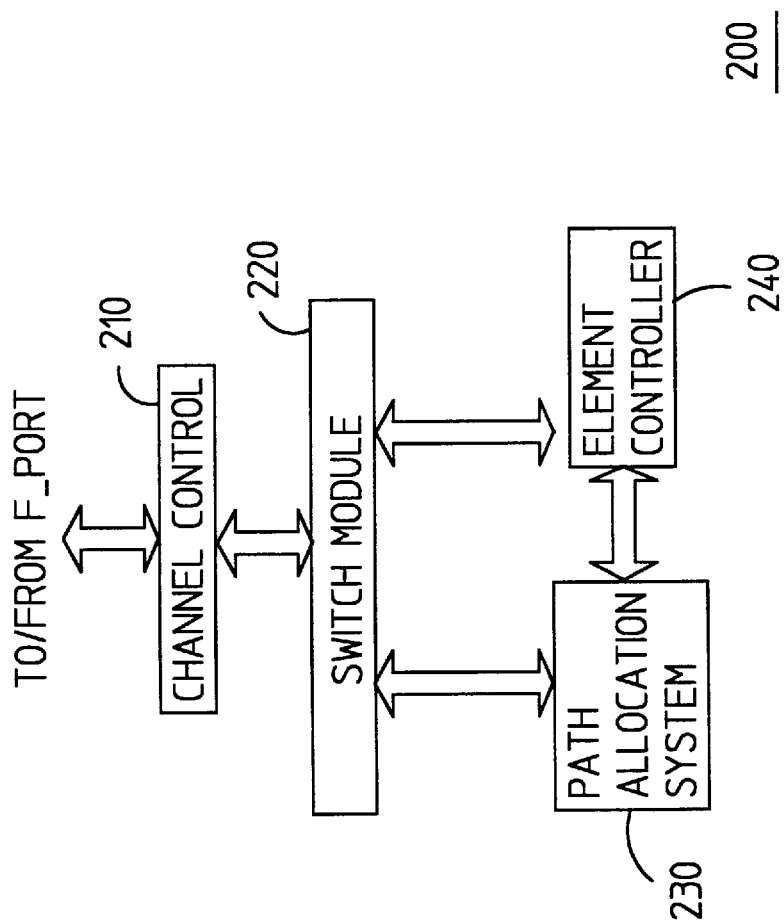

BYPASS SWITCHING AND MESSAGING MECHANISM FOR PROVIDING INTERMIX DATA TRANSFER FOR A FIBER OPTIC SWITCH USING A BYPASS BUS AND BUFFER

This is a continuation of application Ser. No. 08/547,856 filed on Oct. 25, 1995, now abandoned.

FIELD OF THE INVENTION

The present invention relates generally to high speed data communications networks and more particularly to a bypass switching and messaging mechanism for inserting individual data frames into a continuous stream of frames on a fibre channel network.

BACKGROUND OF THE INVENTION

Mainframes, super computers, mass storage systems, workstations and very high resolution display subsystems are frequently connected together to facilitate file and print sharing. Common networks and channels used for these types of connections oftentimes introduce communications bottlenecking, especially in cases where the data is in a large file format typical of graphically-based applications.

There are two basic types of data communications connections between processors, and between a processor and peripherals. A "channel" provides a direct or switched point-to-point connection between communicating devices. The channel's primary task is merely to transport data at the highest possible data rate with the least amount of delay. Channels typically perform simple error correction in hardware. A "network," by contrast, is an aggregation of distributed nodes (e.g., workstations, mass storage units) with its own protocol that supports interaction among these nodes. Typically, each node contends for the transmission medium, and each node must be capable of recognizing error conditions on the network and must provide the error management required to recover from the error conditions One type of communications interconnect that has been developed is Fibre Channel. The Fibre Channel protocol was developed and adopted as the American National Standard for Information Systems (ANSI). See *Fibre Channel Physical and Signaling Interface,* Revision 4.2, American National Standard for Information Systems (ANSI) (1993) for a detailed discussion of the fibre channel standard. Briefly, fibre channel is a switched protocol that allows concurrent communication among workstations, super computers and various peripherals. The total network bandwidth provided by fibre channel is on the order of a terabit per second. Fibre channel is capable of transmitting data frames at rates exceeding 1 gigabit per second in both directions simultaneously. It is also able to transport existing protocols such as internet protocol (IP), small computer system interface (SCSI), high performance parallel interface (HIPPI) and intelligent peripheral interface (IPI) over both optical fiber and copper cable.

Essentially, fibre channel is a channel-network hybrid, containing enough network features to provide the needed connectivity, distance and protocol multiplexing, and enough channel features to retain simplicity, repeatable performance and reliable delivery. Fibre channel allows for an active, intelligent interconnection scheme, known as a "fabric," to connect devices. A fabric is an entity that interconnects various network elements or "node-ports" (N_ports), attached to the fabric. The fabric has the capability of routing data frames based upon information contained within the frames as specified by a class of service. The N_port simply manages the simple point-to-point connection between itself and the fabric. That transmission is isolated from the control protocol so that different topologies (e.g., point-to-point links, rings, multidrop buses, crosspoint switches) can be implemented. The fabric is self-managed so that N_ports do not need station management functionality, greatly simplifying system implementation.

The Fibre Channel industry standard provides for several different types of data transfers. A class 1 transfer, which requires a dedicated circuit-switched connection between N_ports, involves the transfer of at least one data frame, and often numerous data frames, between N_ports. A class 2 transfer, which is directed to connection-less, frame switching between N_ports, typically involves only a single data frame being transferred from one N port to another N_port. Class 1 and class 2 services provide guaranteed delivery and receipt confirmation. Class 2 requires processing of overhead with every frame that is transferred (i.e., each data frame has an associated header field that needs to be processed before the payload, or data, is actually transferred), whereas class 1 data transfer handles overhead up front with the first frame only. A class 3 transfer is similar to the class 2 transfer, except that class 3 transfers do not provide receipt confirmation.

An optional mode of data transfer that provides some of the functionality of both class 1 and class 2 service is known as intermix. Intermix reserves a separate, low priority data path that is accessible to all N_ports, and permits connection-less traffic, such as a class 2 data transfer, to be interjected into a continuous stream of class 1 data if the appropriate bandwidth is available during idle time.

SUMMARY OF THE INVENTION

The present invention provides a system and method for inserting intermix frames into a continuous stream of class 1 frames. A bypass bus, in conjunction with a buffer, are provided within a fiber optic switch element to route intermix data frame through the switch that is concurrently transmitting class 1 data. A channel module, which is disposed between a switch module and a plurality of fiber optic channels, comprises a port intelligence system and a memory interface system. The port intelligence system is responsible for transmitting and receiving data from the fiber optic channels in accordance with a predetermined protocol, preferably Fibre Channel. The memory interface system comprises a receive memory unit, a transmit memory unit and memory control logic.

When the memory control logic determines that a class 1 data transfer is to occur, the control logic actuates a bypass multiplexer so that the class 1 destination data is transferred directly through the switch element along a bypass bus. When an intermix frame is to be passed through the switch, the intermix frame is passed to a buffer concurrently while class 1 data transfer occurs via the bypass bus. After the intermix frame has been completely written into the buffer, the memory control logic waits to detect a tag indicative of idles which indicates that there is a break in the class 1 data transfer. The control logic will then switch the MUX and cause the buffer to commence writing the intermix frame to the port intelligence system for transfer to a predetermined fiber optic channel.

BRIEF DESCRIPTION OF THE DRAWINGS

FIG. 2 shows a block diagram of a fiber optic switch element according to the present invention.

DETAILED DESCRIPTION OF THE PREFERRED EMBODIMENT

Briefly, the present invention provides a mechanism for routing individual data frames into a continuous stream of data within a fiber optic switch element based upon a parallel, non-blocking, cross-point architecture with centralized control. A bypass bus, in conjunction with a buffer, are provided to implement intermix data transfer.

Figure 1A:
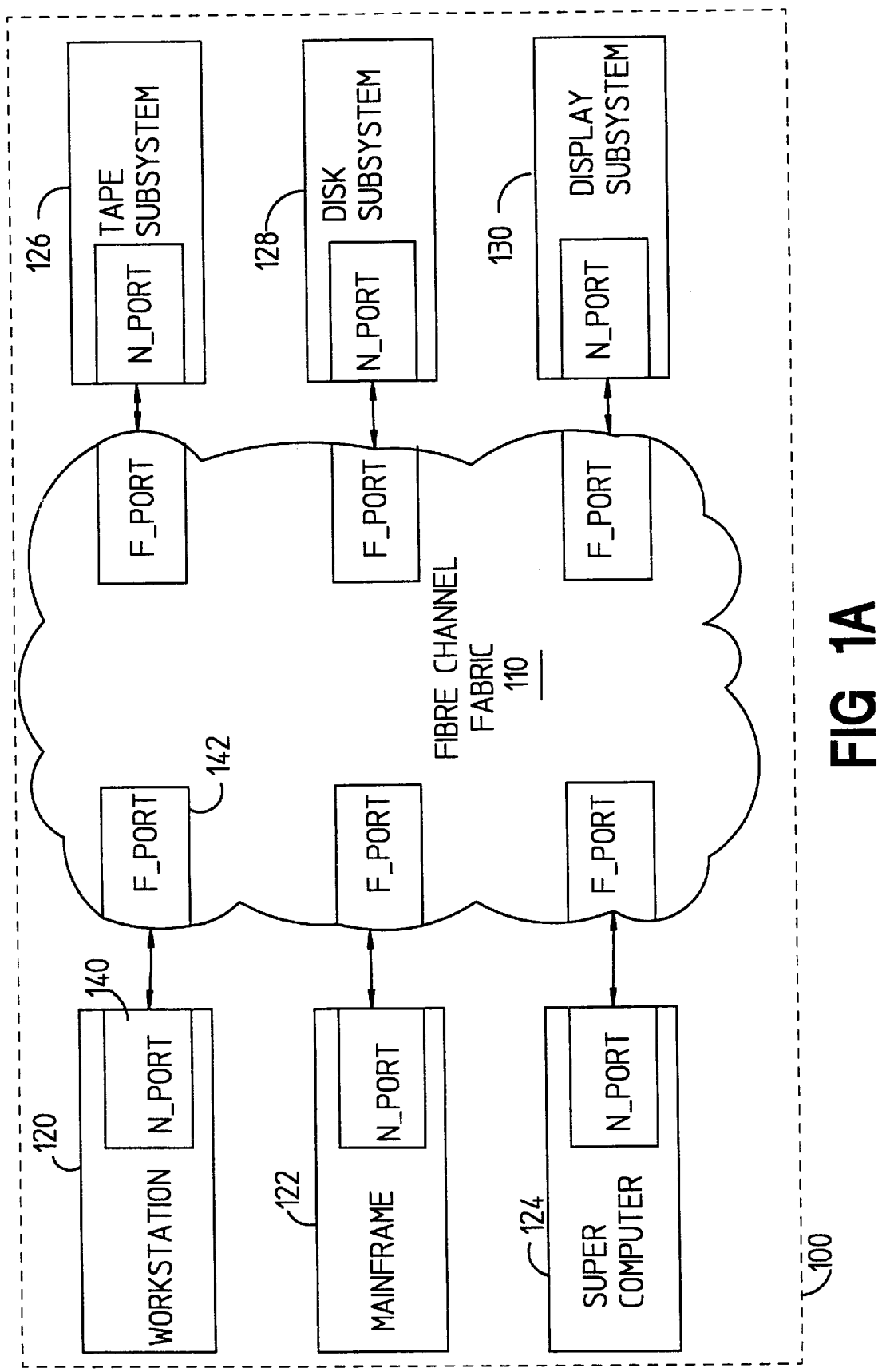
FIG. 1*a* shows a block diagram of a representative Fibre Channel architecture.

As used herein, these terms and phrases are defined as follows:
Class 1
service—a circuit-switched connection providing guaranteed delivery and receipt notification;
Class 2
service—a connectionless, frame-switched link providing guaranteed delivery and receipt notification;
Class 3
service—a connectionless service with no confirmation
F_port—"fabric" port, the access point of the Fabric for physically connecting N_ports;
Fabric—a Fibre Channel-defined interconnection methodology that handles routing in Fibre Channel networks;
Frame—a linear set of transmitted bits that define a basic transport element;
Intermix—a class of service that provides functionality of both Class 1 and 2, Intermix reserves the full channel for a Class 1 connection while allowing Class 2 or Class 3 traffic to pass on available bandwidth;
Link—a communications channel;
N_port—"node" port, a Fibre Channel-defined hardware entity at the node end of a link;

Refer now to FIG. 1a which shows a block diagram of a representative fibre channel architecture. A fibre channel network 100 is presented. A workstation 120, a mainframe 122 and a super computer 124 are interconnected with various subsystems (e.g., a tape subsystem 126, a disk subsystem 128, and a display subsystem 130) via a fibre channel fabric 110. The fabric 110 is an entity that interconnects various node-ports (N_ports) attached to the fabric 110. The essential function of the fabric 110 is to receive frames of data from a source N_port and, using a first protocol, route the frames to a destination N_port. In a preferred embodiment, the first protocol is the fibre channel protocol. Other protocols, such as the asynchronous transfer mode (ATM) could be used without departing from the scope of the present invention.

Each of the various systems and subsystems (e.g., the workstation 120, the tape subsystem 126) connected to the fibre channel fabric 110 comprises an associated N-port 140. The N_port is a hardware entity at the node end of a link. The F-port 142 is the access point of the fabric 110 for physically connecting the various N-ports 140. The fabric 110 has the capability of routing data frames (see FIG. 1b below) based upon information contained within the frames as specified by a class of service. The N_port simply manages the simple point-to-point connection between itself and the fabric 110. The fabric 110 is self-managed so that N_ports do not need station management functionality, greatly simplifying system implementation.

Figure 1B:
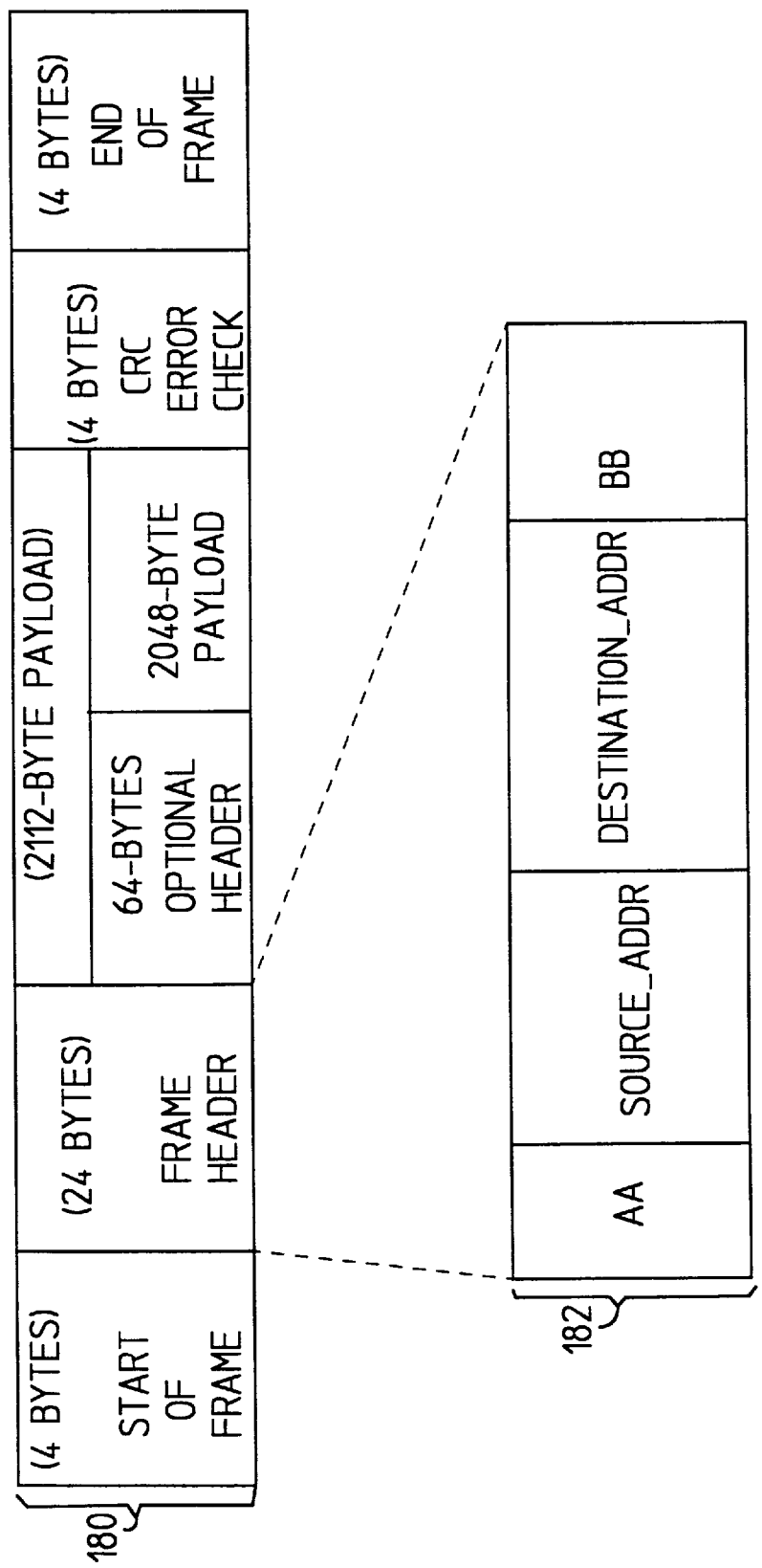
FIG. 1b shows representative composition of a data frame in Fibre Channel.

FIG. 1b shows the composition of a data frame according to the present invention. In a preferred embodiment, the data frame can be up to 2,148 bytes wide, depending upon the size of the payload. A frame 180 is the smallest indivisible packet of data that is sent through a fibre channel network. Addressing of the frame 180 is done within the frame header 182 which is 24 bytes long. Frames consist of the following fields:

a start-of-frame delimiter (4 bytes);

a frame header (24 bytes);

optional headers (64 bytes);

a variable-length payload containing user data (from 0 to 2048 bytes);

a cyclic redundancy check error check (4 bytes); and an end-of-frame delimiter (4 bytes).

The frame header 182 can be further defined as shown (AA and BB representing a plurality of fields each). The addressing of the frame 180 is accomplished using a source address (SOURCE_ADDR) and destination address (DESTINATION_ADDR). Each connected N_port has a unique address identifier.

FIG. 2 shows a block diagram of a fiber optic switch element according to the present invention. The fiber optic switch element 200 enables implementation of a fibre channel network by permitting selective interconnection of a plurality of fiber optic channels (not shown). The fiber optic switch 200 permits both circuit and frame switching. Circuit switching enables data transfer on a dedicated connection. In the circuit-switched mode, a dedicated path between two N_ports is established before data transfer occurs. This dedicated path is maintained until either of the two N_ports disconnects. Frame switching is a connectionless data transfer mode in which the routing resources are dynamically allocated on a frame-by-frame basis.

A switch module 220 is connected to an F_port within the fibre channel fabric through a channel control box 210. The switch module 220 is responsible for core switching bandwidth. A path allocation system 230, which is connected to the switch module 220, generally directs frames between F_ports (logically located within the channel control box 210) through the switch module 220. The path allocation system 230 is essentially a specialized multi-processor subsystem for the allocation and control of switching and port resources. Frame switching requires a relatively large amount of buffering while circuit switching requires preallocation of routing resources.

To accomplish both circuit and frame switching, the fiber optic switch element 200 provides local buffering at the channel control box 210 with centralized routing hardware in the path allocation system 230. In a preferred embodiment, there are two modes of buffering. The first mode is known as "cut-through" mode buffering. Cut-through mode allows frame data to be read as the frame is being written to the buffer. This mode facilitates faster routing of the data frames through the switch element 200. The channel control box 210 typically operates under the cut-through mode when the switch 200 is lightly loaded. The second mode is known as "store-and-forward" mode buffering. This mode resembles the more standard type of buffering in which the entire frame is written to the buffer before it can be read out. The store-and-forward mode is typically used during intermix operation, for example.

An element controller 240, which is connected to the path allocation system 230 and switch module 220, provides centralized fabric management. A feature of the element controller 230 is an embedded port to communicate with N_ports.

Figure 3:
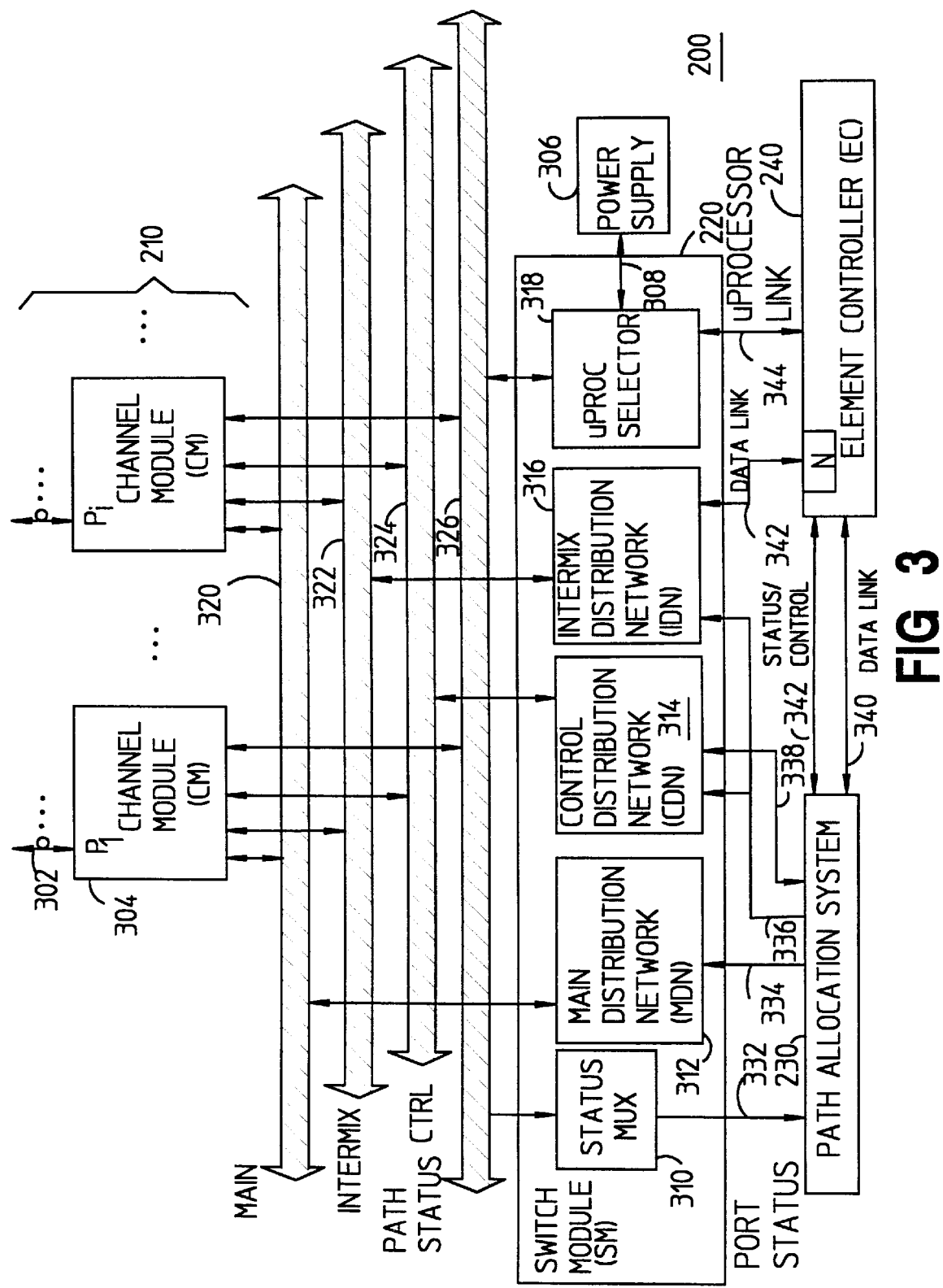
FIG. 3 shows a more detailed block diagram of the fiber optic switch element.

FIG. 3 shows a more detailed block diagram of the fiber optic switch element 200. The fiber optic switch 200 has a plurality of channel modules 304 to which the fiber optic channels 302 are connected via respective ports $p_1$ through $p_i$. In a preferred embodiment, there can be 1 to 4 channel modules. Configurations contemplated by the present invention include: four channel modules, each providing a 266 MBaud bi-directional path into the fabric; two 531 MBaud channel modules; and a single 1063 MBaud channel module. Other configurations can be implemented without departing from the scope of the present invention.

Each channel module 304 is connected to one or more of the fiber optic channels 302 and provides port intelligence as well as receive memory for temporarily storing data frames. The channel modules 304 are connected to the switch module 220, which distributes electrical energy from a power supply 306 via connection 308. In the preferred embodiment, the switch module 220 is implemented as part of a back plane; a number of functional interface elements are disposed upon the back plane.

The switch module 220 has a status multiplexer (MUX) 310 which is configured to receive status signals from the channel module 304 concerning the fiber optic channels 302. The status signals include at least the following: a "new frame arrived" signal, which indicates when a new data frame has been received by a receive memory (see FIG. 5) in the channel module 304 and when new header information is ready to be sent to the path allocation system 230; a "receiver ready ('rxready')" signal, which indicates when the data received from a port (p1 through pi) is ready to be sent through the switch 200 from the receive memory; an "intermix bus ready" signal, which indicates when the intermix distribution network (IDN) 316 is ready (i.e., not being used) and not ready (i.e., currently being used) to transfer data; a "port active" signal, which indicates when a port intelligence mechanism (see FIG. 5) is active/inactive; a "transmitter ready" signal, which indicates when a transmit memory (see FIG. 5) is ready to receive data destined to be transmitted to a port intelligence mechanism; an "intermix ready" signal, which indicates when the IDN is ready or not ready to perform an intermix transfer; and a "transfer status ready ('xfer ready')" signal, which indicates when a frame has been completely transmitted and status information related to the newly transmitted frame is ready to be transferred to the path allocation system 230 from the status/control logic unit of the channel module (see FIG. 5).

A main distribution network (MDN) 312 selectively interconnects the data paths of the channels 302. In a preferred embodiment, the MDN 312 is a 16×16 non-blocking crosspoint switch. A control distribution network (CDN) 314 communicates control signals to the various channel modules 304. For example the CDN 314 informs channel modules when a data frame may be sent. An intermix distribution network (IDN) 316 selectively interconnects intermix paths between channel modules 304. Intermix paths are a set of alternate data paths which are separate from those data paths associated with the MDN 312 and which can permit data flow between selected channels 302 while data paths of the MDN 312 are in use. In a preferred embodiment, both the CDN 314 and the IDN 316 are implemented by a 8×8 crosspoint switch. Finally, a processor (uProc) selector 318 can optionally be provided as part of an auxiliary system for interconnecting processors and controllers distributed throughout the fiber optic switch 200. For example, the uProc selector 318 facilitates communication between the channel modules 304 and an element controller (EC) 240.

The path allocation system 230 is connected to the switch module 220 and, particularly, to the status MUX 310, the MDN 312, the CDN 314 and the IDN 316. The path allocation system 230 generally allocates data interconnect paths between fiber optic channels 302 and determines the priority of the connections.

Also connected to the switch module 230 is an element controller (EC) 240. The EC 240 essentially provides servers (e.g., a name server, a time server) for the fiber optic switch element 200. The EC 240 has a data link 340 with the path allocation system 230 for communicating server information and a status/control connection 342 for exchanging status/control signals with the path allocation system 230. The EC 240 also exchanges server information with the IDN 316 and the processor selector 318 via respective links 342, 344. Data link 342 provides an embedded port into the element controller 240. The embedded port behaves essentially as an N_port which can be addressed as if it were another system connected to the switch 200. The embedded port facilitates operator control of the switch element 200. For example, when a system such as a workstation plugs into the switch for the first time, the system will attempt to communicate with the switch 200 by logging on. The embedded port will send switch configuration information back to the new system and will provide information indicative of the other systems and subsystems that are already connected to the switch 200.

The EC 240 comprises a microprocessor and various memory elements including a flash EPROM, RAM and a Boot ROM. The Boot ROM stores a Boot Manager and self-test software for the EC 240. The flash EPROM is used to store an operating system, such as VxWorks, available from Wind River Systems, U.S.A., and additional firmware for the switch module and path allocation system. In a preferred embodiment, the microprocessor within the EC 240 is a model i960CA, manufactured by Intel.

Figure 4:
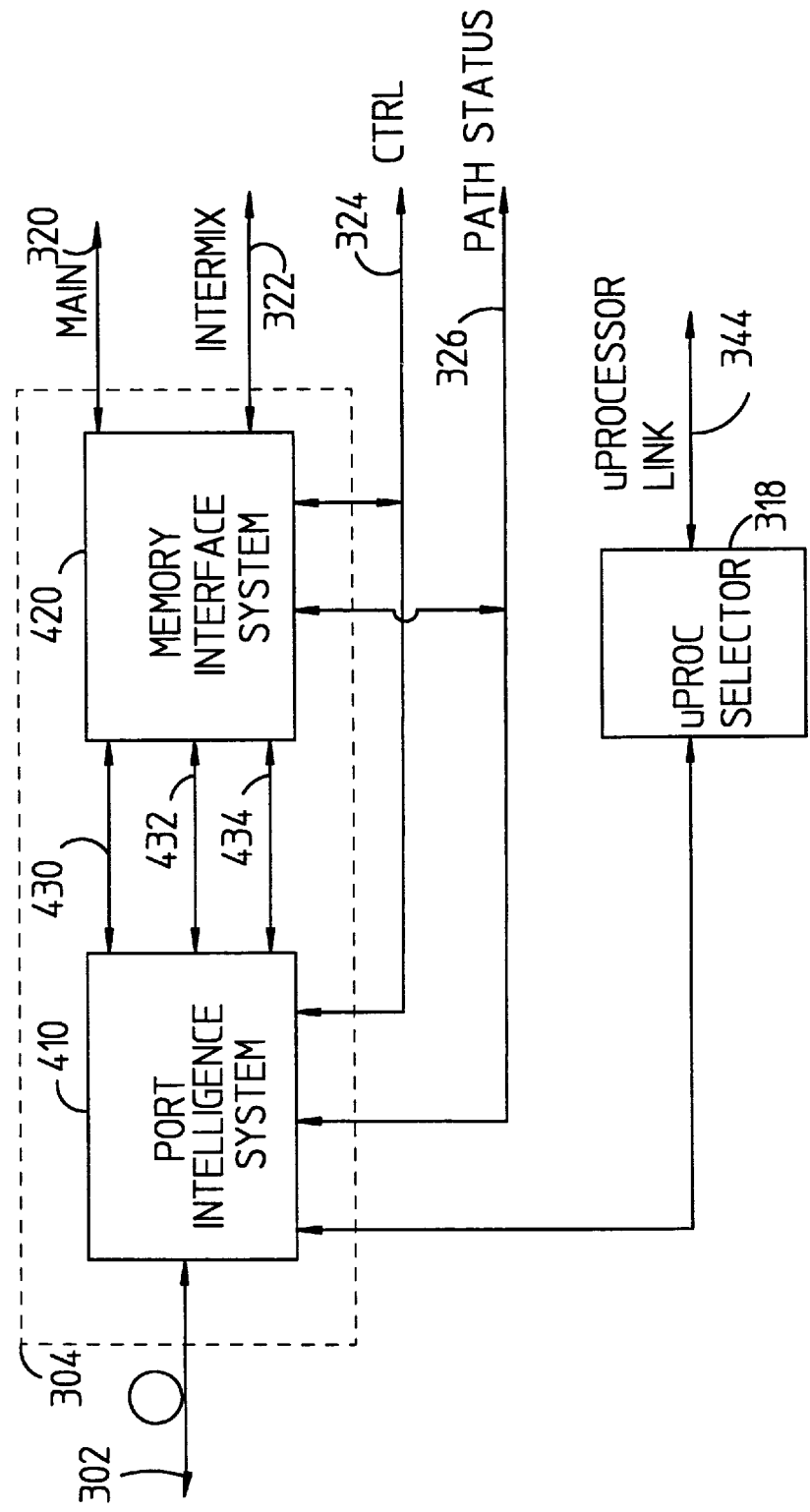
FIG. 4 shows a block diagram of the channel module in FIG. 3.

FIG. 4 shows a block diagram of the channel module in FIG. 3. The channel module 304 comprises a port intelligence system 410 and a memory interface system 420. In a preferred embodiment, the channel module 304 provides a 1063 MBaud bi-directional path into the fabric.

The port intelligence system 410 comprises at least one transceiver and a first application-specific integrated circuit (ASIC). Essentially, the port intelligence system 410 provides port intelligence adapted to transmit and receive data according to a specific protocol, preferably fibre channel, associated with the fiber optic channel 302. The port intelligence system 410 is interchangeable to accommodate a variety of protocols, such as asynchronous transfer mode (ATM). Additionally, the port intelligence system 410 can be adapted to be hooked up to channels with different bit rates. A conventional optical link card (OLC), such as an OLC266 manufactured by IBM, can be utilized to directly interface the port intelligence system 410 to the fiber optic channel 302. In a preferred embodiment, the first ASIC is configured to support three modes of operation: 266-, 531- and 1063-MBaud data transfer.

The memory interface system 420 comprises at least one frame buffer and a second ASIC which is configured differently from the first ASIC in the port intelligence system 410. The frame buffer may be random access memory with bit-sliced organization. Additionally, separate receive buffers and transmit buffers may be used. The second ASIC is a bit-sliced chip for memory management and is responsible for connecting the memory interface system 420 to the internal switch data paths via the main link 320 and the intermix link 322.

Figure 5:
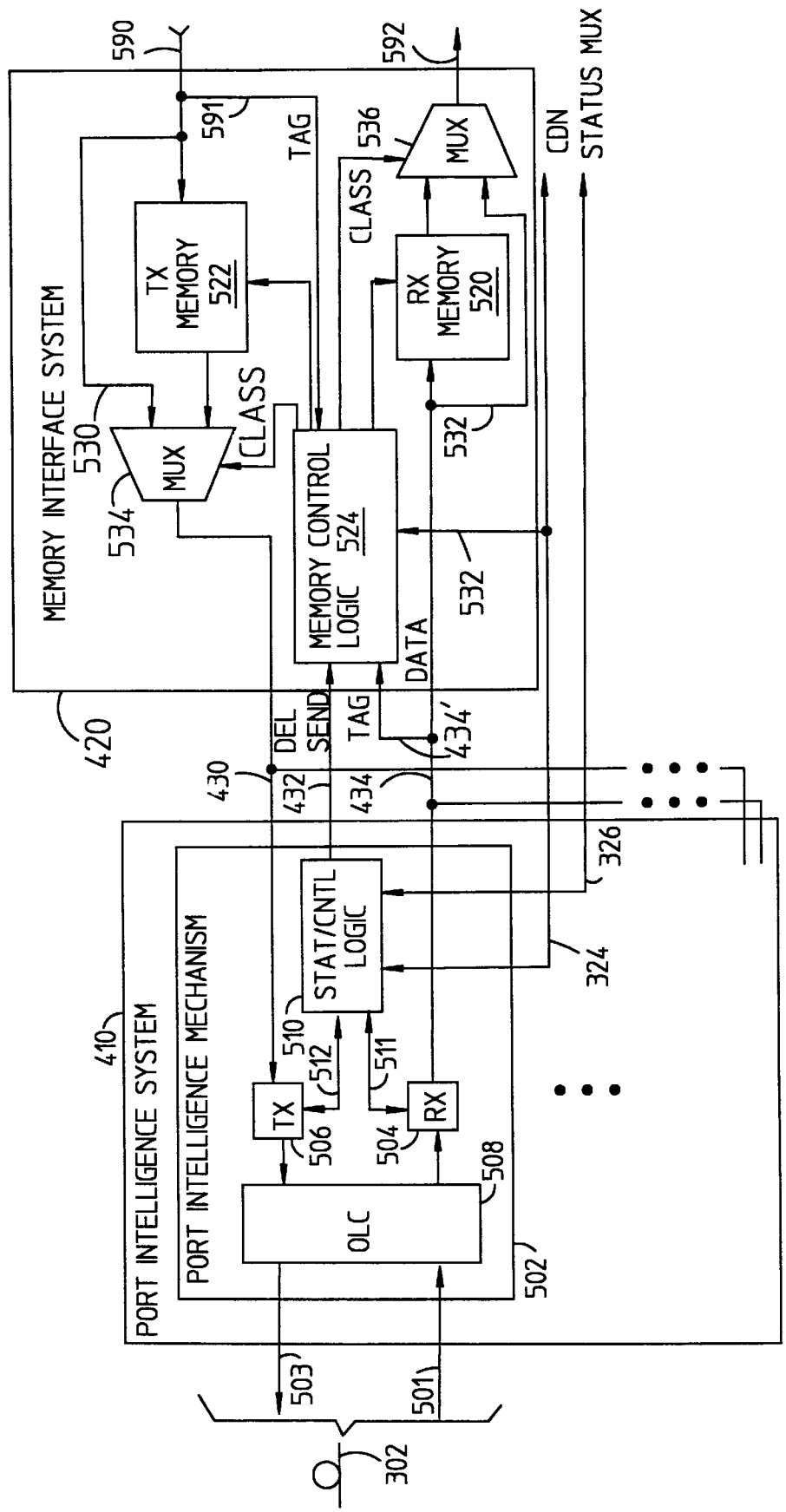
FIG. 5 shows a more detailed block diagram of the channel module.

FIG. 5 shows a more detailed block diagram of the channel module of FIGS. 3 and 4. The port intelligence system 410 has one or more port intelligence mechanisms 502. One port intelligence mechanism 502 is allocated to each fiber optic channel 302. Each port intelligence mechanism 502 has a receiver (RX) 504, a transmitter (TX) 506, an optical link card (OLC) 508, and a status/control (STAT/CNTL) logic 510. The receiver 504 and the transmitter 506 are adapted to receive and transmit data, respectively, through their corresponding input and output fibers 501, 502 (shown collectively in FIG. 3 as channel 302) in accordance with the Fibre Channel industry standard protocol and at the channel's particular bit rate.

The OLC 508 is utilized to directly interface the port intelligence mechanism 502 to the fiber optic channel 302. The OLC 508 provides an optical-to-electrical conversion as well as a serial-to-parallel conversion between the input fiber 501 of the channel 302 and the receiver 504. Furthermore, the OLC 508 provides an electrical-to-optical conversion as well as a parallel-to-serial conversion between the output fiber 502 of the channel 302 and the transmitter 506.

The status/control logic 510 monitors and controls both the receiver 504 and the transmitter 506, as indicated by corresponding bidirectional control connections 511,512. Further, the status/control logic 510 exchanges control signals on control connection 324 with the CDN (item 314 in FIG. 3), provides status signals on connection 326 to the status MUX (item 310 in FIG. 3) indicative of, e.g., whether the corresponding port ($p_1$ through $p_i$) is available or busy, and forwards control signals to the memory interface system 420 via connection 432. The status/control logic 510 further recognizes when a new frame is received by the receiver 504 and determines the transfer class (either 1 or 2) as well as the length of data pertaining to each new frame. It should be noted that a frame could have no data, as for example, in the case of an SOFc1 frame (i.e., a start of frame for class 1 service), which is initially passed through the switch 200 for setting the switch 200 up to reserve a bidirectional path for a class 1 data transfer.

The memory interface system 420 is connected in series with the port intelligence system 410, and particularly, with each port intelligence mechanism 502 located within the port intelligence system 410. The memory interface system 420 generally provides class 1 bypass data connections 530,532 for class 1 data transfers and provides temporary storage for class 2 data transfers. For data storage relative to class 2 data transfers, the memory interface system 420 has a receive memory (RX MEMORY) 520 for source data, a transmit memory (TX MEMORY) 522 for destination data, and memory control logic 524 for controlling the receive and transmit memories 520,522. The receive memory 520 and the transmit memory 522 may be partitioned into a number of individual buffers or memory blocks, if desired.

When incoming class 1 source data is received by the memory interface system 420 from the port intelligence system 410, the source data bypasses the receive memory 520 via bypass data connection 532, MUX 536, and data connection 592. The data connection 592 introduces the source data to the data buses of the MDN 312 or the IDN 316 of the switch module 220. The memory control logic 524 receives a tag 434' from the receiver 504 indicative of either a class 1 or class 2 data transfer and controls the MUX 536 accordingly on class control connection 533. The receiver 504 generates the tag based upon the frame header (item 182 in FIG. 1*b*) on the incoming data. In a preferred embodiment, two-bit tags are used. A tag "00" indicates nonuse. A tag "01" indicates data. A tag "10" indicates either start-of-frame (SOF) or end-of-frame (EOF) for a class 1 data transfer. A tag "11" indicates either SOF or EOF for a class 2 data transfer.

When incoming class 2 source data is received by the memory interface system 420, as indicated by tag "11," the receive memory 520 reads and stores the source data from the receiver 504 via data connection 434 under control of the memory control logic 524. The receive memory 520 writes data to the data buses of the MDN 312 or the IDN 316 of the switch module 220 via MUX 536 and data connection 592, when the timing is appropriate. In order to transfer data from the receive memory 520 to the data buses, the CDN (item 314 in FIG. 3) communicates a send control signal 324 to the status/control logic 510. The status/control logic 510, in turn, forwards a send signal to the memory control logic 524. The send signal designates the length of the data frame to be sent.

Figure 6:
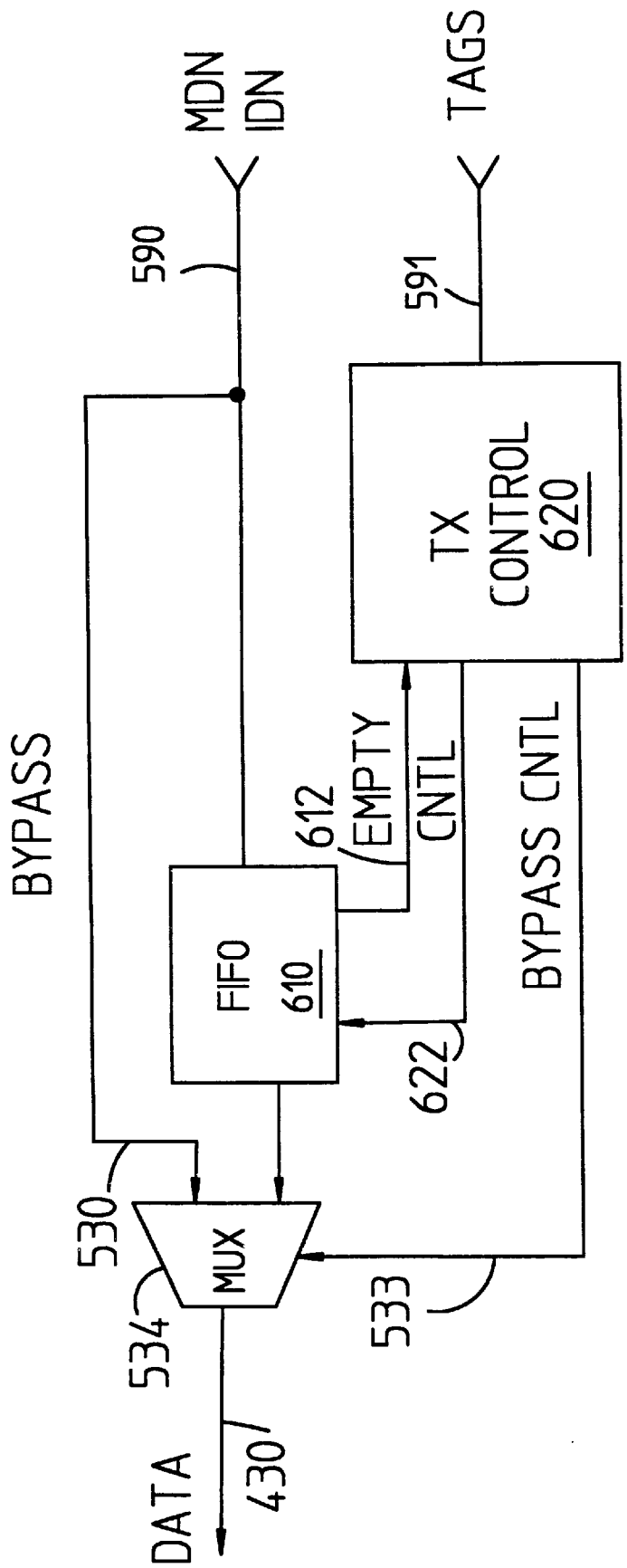
FIG. 6 shows a more detailed block diagram of a first embodiment of the memory interface system, and in particular, the transmit memory and control thereof during intermix operation.

FIG. 6 shows a more detailed block diagram of a first implementation of the memory interface system, and in particular, the transmit memory and control thereof during intermix operation. The destination data on connection 590 is channeled to a first-in-first-out (FIFO) buffer 610 which is located within the transmit memory (item 522 in FIG. 5). In a preferred embodiment, the FIFO 610 is a 4 k×9 FIFO. The destination data is also sent to the bypass MUX 533 via bypass connection 530. Transmit control logic 620, which is located within the memory control logic (item 524 in FIG. 5), controls the FIFO 610 through logical messaging via control connection 622. Transmit control logic 620 also controls the MUX 534 through logical messaging via bypass control connection 533. Moreover, the FIFO 610 is capable of informing the transmit control logic 620 when it is empty via empty control connection 612.

The transmit control logic 620 receives and monitors two-bit tags 591 from the data buses (from the MDN 312 and IDN 316) in order to determine when bit sliced destination data bits are to be received and in order to determine the class. The coding of the two-bit tag 591 is the same as that for the two-bit tags as described above.

Except for a class 1 data transfer that utilizes the intermix bus, when the transmit control logic 620 determines that a class 1 data transfer is to occur, the transmit control logic 620 actuates the bypass MUX 534, using a logical message, via bypass control connection 533 so that the class 1 destination data is transferred directly from connection 590 to the connection 430 via the bypass connection 530. In a preferred embodiment, the messaging function is accomplished with special 32-bit messages, for example the message '0000 0000 0000 0000 0000 0000 0000 0001' could indicate that the bypass MUX 534 can be actuated. Ultimately, the class 1 data is forwarded to a transmitter 506 of an appropriate port intelligence mechanism 502.

When an intermix frame is to be passed through the switch 200, the intermix bus of the IDN 316 passes the intermix frame to the FIFO 610 concurrently while class 1 data transfer occurs via the bypass connection 530. After the intermix frame has been completely written into the FIFO 610, the transmit control logic 620 waits to detect a tag "00" pertaining to the class 1 data transfer which indicates that there is a break (i.e., idles) in the class 1 data transfer. The transmit control logic 620 will then switch the MUX 534 via control connection 533 and cause the FIFO 610 to commence writing the intermix frame to the MUX 534 via control connection 622 so that the intermix frame is forwarded to the appropriate port intelligence mechanism 502 along data connection 430.

As the intermix frame is written from the FIFO 610, if the class 1 data transfer recommences, then the class 1 data transfer is channeled through the FIFO 610 behind the intermix frame so that a continuous data flow is maintained from the memory interface system 420 to the port intelligence system 410. If the class 1 data transfer does not recommence while the intermix frame is output, then the FIFO 610 will send an empty signal 612 to the transmit control logic 620 after the intermix frame has been entirely output. In turn, the transmit control logic 620 will switch the MUX 534 so that when the class 1 data transfer does recommence, it will be channeled along the bypass connection 530.

When the transmit control logic 620 determines, based upon tags 591, that a class 2 data transfer is to occur, the transmit control logic 620 controls the FIFO 610 to read data from data connection 590, and to write data to and actuate the MUX 534 via bypass control connection 533 so that the data written out of the FIFO 610 goes directly to connection 430. In other words, the class 2 data is read from the FIFO 610 by the transmitter (item 506 FIG. 5) of an appropriate port intelligence mechanism and forwarded to the corresponding port ($p_1$ through $p_i$).

Figure 7:
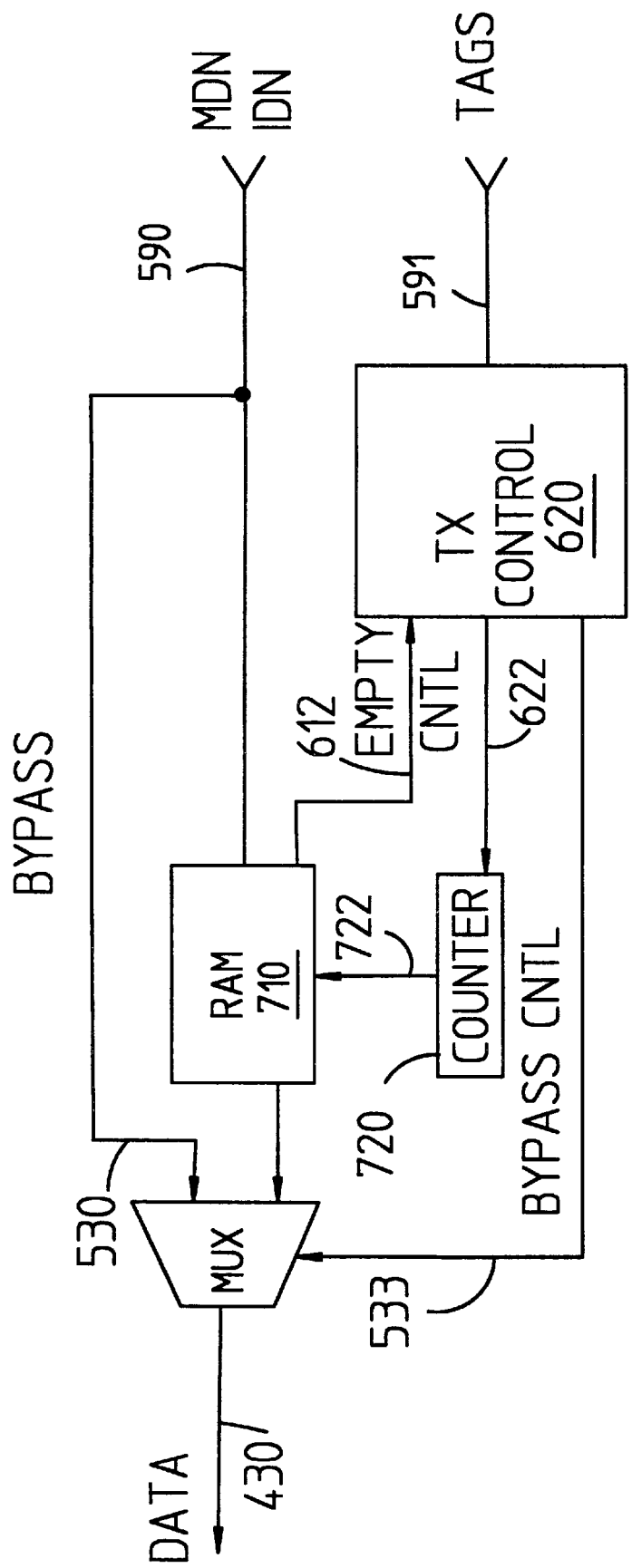
FIG. 7 shows a more detailed block diagram of a second embodiment of the memory interface system, and in particular, the transmit memory and control thereof during intermix operation.

FIG. 7 shows a more detailed block diagram of a second embodiment of the memory interface system, and in particular, the transmit memory and control thereof during intermix operation. The destination data on connection 590 is channeled to a random access memory (RAM) 710 which is located within the transmit memory (item 522 in FIG. 5). In a preferred embodiment, the RAM 710 is a dual-ported RAM. As in FIG. 6, the destination data is also sent to the bypass MUX 533 via bypass connection 530. Transmit control logic 620, which is located within the memory control logic (item 524 in FIG. 5), controls the RAM 710 through logical messaging via control connection 622 and counter 720. In a preferred embodiment, the counter 720 is a synchronous up/down counter which is configured to generate successive addresses for the RAM 710 when the counter 720 is enabled by the control connection 622.

This second embodiment of the memory interface system operates in much the same manner as described above in conjunction with FIG. 6. In particular, class 1 destination data is transferred directly from connection 590 to the connection 430 via the bypass connection 530. When an intermix frame is to be passed through the switch 200, the intermix bus of the IDN 316 passes the intermix frame to the RAM 710 concurrently while class 1 data transfer occurs via the bypass connection 530. After the intermix frame has been completely written into the RAM 710, the transmit control logic 620 waits to detect a tag "00" pertaining to the class 1 data transfer which indicates that there is a break (i.e., idles) in the class 1 data transfer. The transmit control logic 620 will then switch the MUX 534 via control connection 533 and cause the RAM 710 to commence writing the intermix frame to the MUX 534 via control connection 622 and the counter 720 so that the intermix frame is forwarded to the appropriate port intelligence mechanism 502 along data connection 430.

As the intermix frame is written from the RAM 710, if the class 1 data transfer recommences, then the class 1 data transfer is channeled through the RAM 710 behind the intermix frame so that a continuous data flow is maintained from the memory interface system 420 to the port intelligence system 410. If the class 1 data transfer does not recommence while the intermix frame is output, a comparator (not shown) compares a read address pointer with a write address pointer to determine if the RAM 710 is empty (i.e., the intermix frame has been entirely output from RAM 710). In turn, the transmit control logic 620 will switch the MUX 534 so that when the class 1 data transfer does recommence, it will be channeled along the bypass connection 530.

Figure 8:
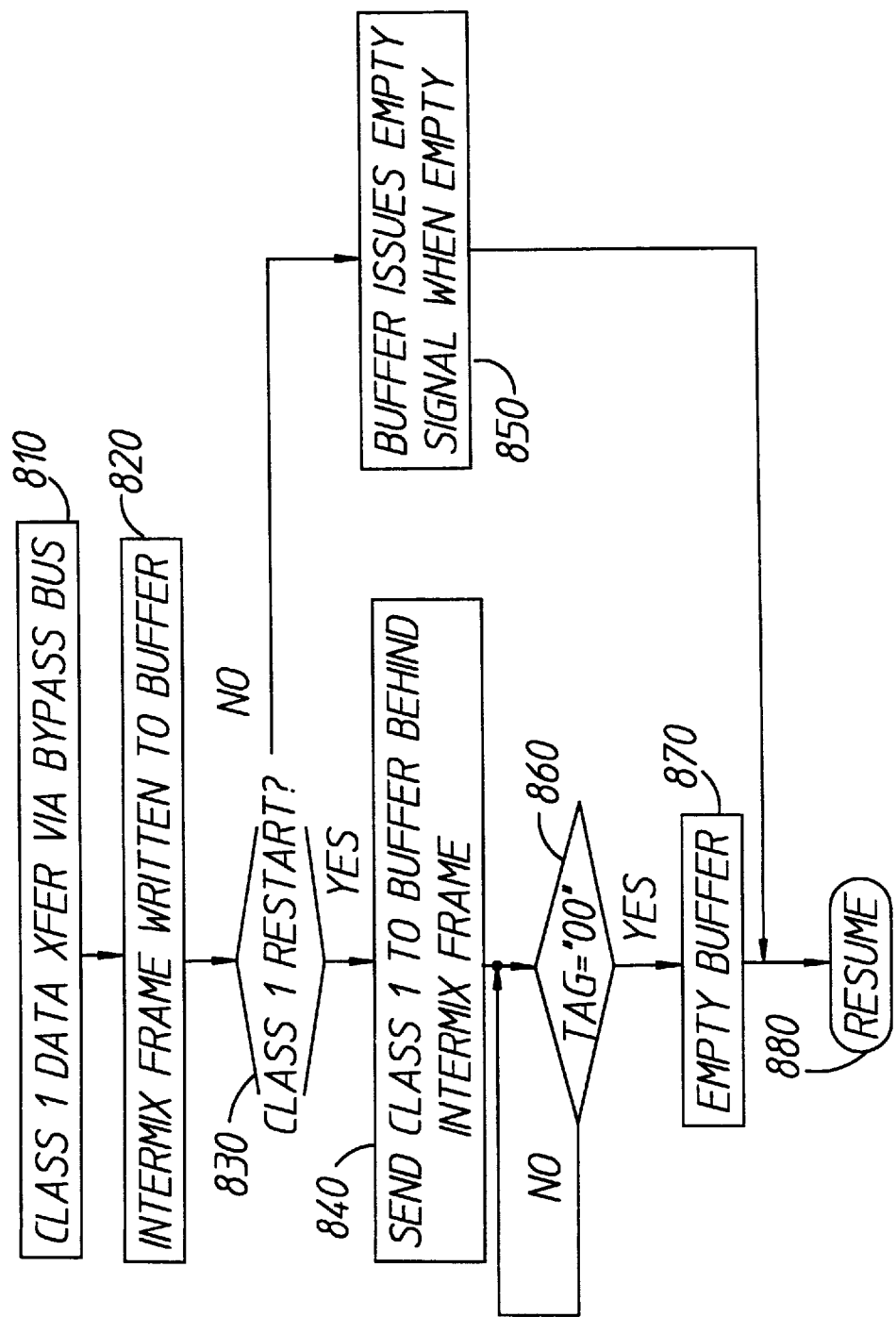
FIG. 8 shows a flow diagram of the preferred method of sending an intermix frame.

FIG. 8 shows a flow diagram of the preferred method of sending an intermix frame. Block 810 indicates that the switch element 200 is presently in a class 1 data transfer. Class 1 service is the only data transfer that uses the bypass bus (item 530 in FIGS. 5 and 6). Block 820 has an intermix frame arrive at the buffer (item 610 in FIG. 6; item 710 in FIG. 7) while the class I data is being sent through the switch across the bypass bus. Decisional block 830 determines whether class 1 data resumes after the intermix frame is written to the buffer. If class 1 restarts, then control is passed to block 840 which writes the new class 1 data to the buffer behind the intermix frame. If there is no class 1 data transmitted after the intermix frame is written to the buffer, control is passed to block 850 which causes the buffer to issue an empty signal when the buffer empties by writing the intermix data to the data connection line (item 430 in FIGS. 4–6).

Decisional block 860 determines when the tag is equal to "00," which indicates nonuse, i.e., there is a space after the class 1 data transfer stream in which to insert the intermix frame. If there is no space, decisional block 860 simply loops back to itself until the tag is "00." When the tag finally equals "00," control is passed to block 870 which empties the buffer before resuming normal operations, either class 1 service or some other service depending on the status of the tags and the switch.

While the present invention has been illustrated and described in connection with the preferred embodiment, it is not to be limited to the particular structure shown. It should be understood by those skilled in the art that various changes and modifications may be made within the purview of the appended claims without departing from the spirit and scope of the invention in its broader aspects.

What is claimed is:

1. A system for providing the capability to accommodate intermix data transfer in a fiber optic switch, the switch is connected to a fiber optic channel, the system comprising:
    a port intelligence system configured to transmit and receive data from the fiber optic channel according to a first protocol;
    a memory interface system connected to the port intelligence system; and
    a buffer residing in the memory interface system, the buffer responsive to a control signal to selectively receive intermix data and class 1 data.

2. The system of claim 1, further comprising a bypass bus connected to an input of the buffer.

3. The system of claim 2, further comprising:
    a MUX connected to an output of the buffer and the bypass bus;

a transmit control logic unit connected to the buffer and the MUX, the transmit control logic unit controls both the buffer and the MUX to transfer intermix data;

an empty signal generated by the buffer and coupled to the transmit control logic unit indicating that the buffer is empty the transmit control logic unit being responsive to the empty signal to cause the buffer to select the class 1 data and cause the MUX to transfer the class 1 data on the bypass bus.

4. The system of claim 3, wherein the transmit control logic sends a bypass control message to the MUX, the bypass control message instructs the MUX to switch between the buffer output and the bypass bus.

5. The system of claim 4, wherein the transmit control logic sends a control message to the buffer, the control message instructs the buffer to read data from the buffer input and write data to the MUX.

6. The system of claim 5, wherein the buffer is a FIFO.

7. The system of claim 5, wherein the buffer is a dual-ported RAM.

8. The system of claim 7 further comprising:

a synchronous up/down counter configured to generate successive addresses to the dual-ported RAM, wherein the synchronous up/down counter is enabled by a control signal from the transmit control logic unit.

9. The system of claim 5, wherein the first protocol is Fibre Channel.

10. A method for injecting intermix data into a continuous stream of class 1 data, the continuous stream of class 1 data being transferred through a fiber optic switch, the fiber optic switch having an input and an output, the method comprising the steps of:

(1) transferring the continuous stream of class 1 data from the input to the output via a bypass bus;

(2) writing an intermix frame to a buffer;

(3) determining when an idle appears in the continuous stream of class 1 data;

(4) writing the intermix frame from the buffer to the output when the idle appears in the continuous stream of class 1 data;

(5) writing subsequent class 1 data to the buffer when class 1 data follows the intermix frame; and (6) writing after step (4), the subsequent class 1 data from the buffer to the output.

11. The method of claim 10, further comprising the steps of:

(5) writing subsequent class 1 data to the buffer when class 1 data follows the intermix frame; and (6) writing, after step (4), the subsequent class 1 data from the buffer to the output.

* * * * *